United States Patent [19]

Meyerhoefer et al.

[11] 4,124,034
[45] Nov. 7, 1978

[54] TEMPERATURE SENSING DEVICE

[75] Inventors: Carl E. Meyerhoefer, Little Neck; Carl H. Meyerhoefer, Huntington Station, both of N.Y.

[73] Assignee: Revlon, Inc., New York, N.Y.

[21] Appl. No.: 736,822

[22] Filed: Oct. 29, 1976

[51] Int. Cl.² ............................................. A45D 2/12
[52] U.S. Cl. .................................... 132/33 R; 219/222
[58] Field of Search ................... 132/33, 40, 42, 9, 37; 219/222, 332–335, 241; 73/343 R, 362 R, 362 AR; 338/22 R

[56] References Cited

U.S. PATENT DOCUMENTS

| 1,652,838 | 12/1927 | Rider | 73/339 |
| 2,088,728 | 8/1937 | Stranszky | 219/334 X |
| 2,388,564 | 11/1945 | Osterheld | 219/39 |
| 2,906,124 | 9/1959 | Chaney | 73/374 |
| 3,487,197 | 12/1969 | D'Elia et al. | 132/33 R |

Primary Examiner—G.E. McNeil
Attorney, Agent, or Firm—Leon E. Tenebaum

[57] ABSTRACT

A temperature sensing device contains a thermistor, a cable connecting the thermistor to a time-temperature control device, and means for securing the device to a hair roller.

9 Claims, 6 Drawing Figures

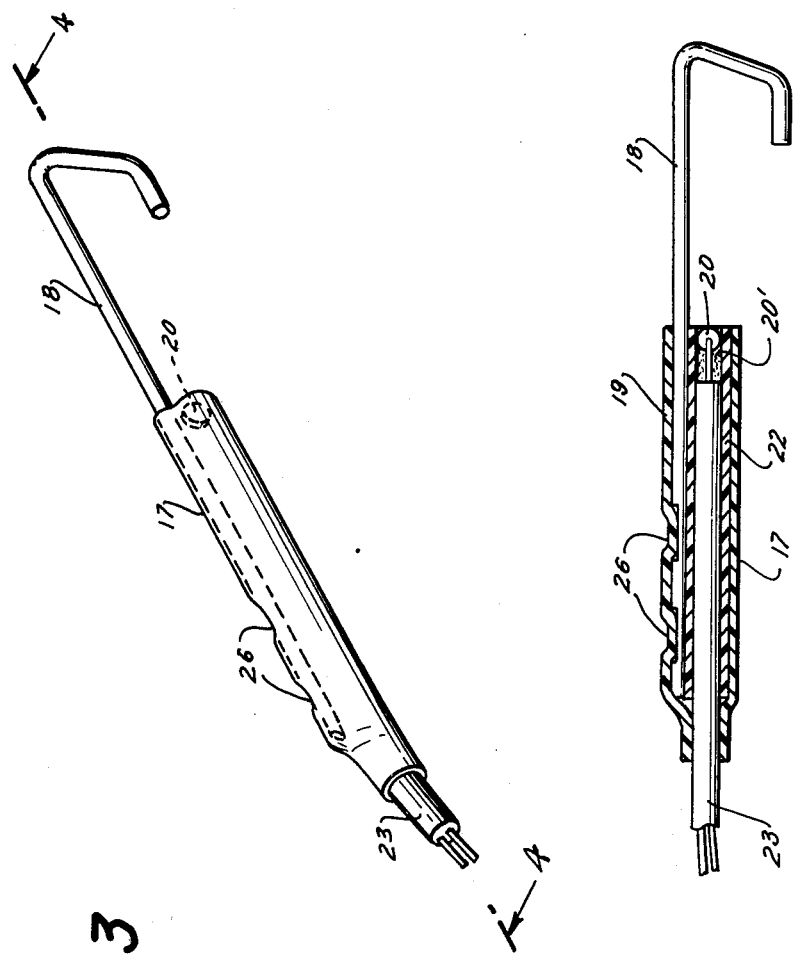

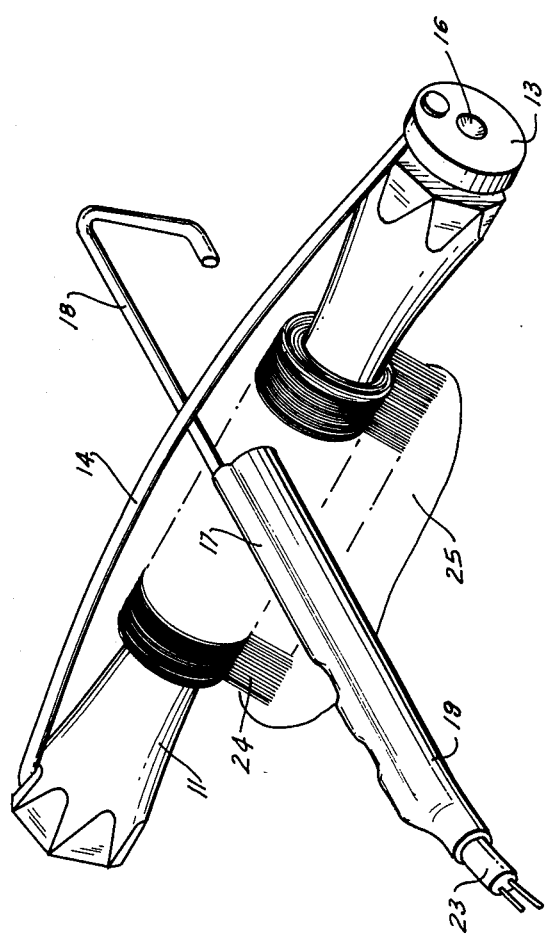
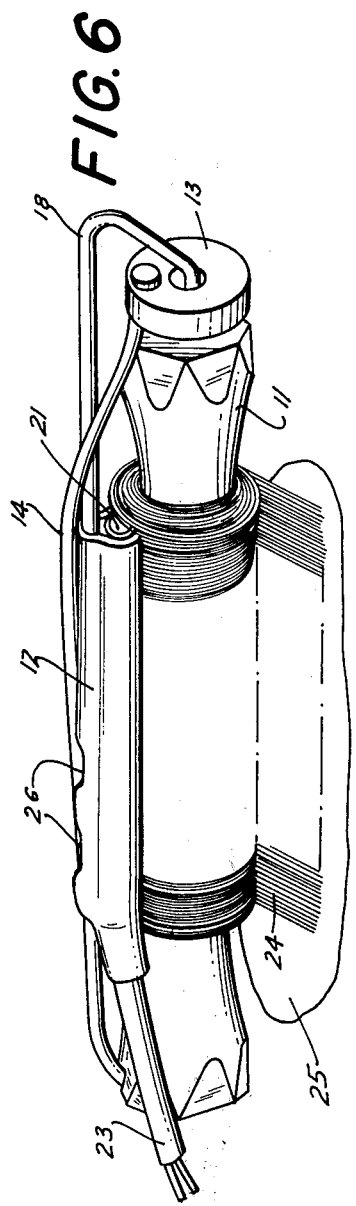

TEMPERATURE SENSING DEVICE

The present invention relates to permanent waving. It particularly relates to a temperature sensing device for use in regulating the temperature during permanent waving at elevated temperatures.

In permanent waving of hair, the hair is treated with a reductant such as a salt of thioglycolic acid, e.g. ammonium thioglycolate, to reduce (i.e. break) the disulfide linkages in hair proteins to sulfhydryl groups. This breakage in the disulfide linkages diminishes the rigidity of the hair proteins, leaving the hair more pliable. The hair is then set, as desired, on curlers, rods or rollers, or, if preferred, the hair may be set prior to reduction. The set hair is then treated with an oxidant, such as a peroxide, to oxidize the sulfhydryl groups to disulfide linkages thereby imparting a rigidity to the wave obtained by setting. These operations, particularly the reduction step, can be carried out at either room or elevated temperature.

It has been found preferable to carry out the reduction at elevated temperatures (i.e. hot waving). In hot waving a plastic cap is used to cover the hair and heat is applied by a conventional salon drier. To check the quality of the wave, the operator must remove the drier and open and then close the plastic cap. These manipulations result in the lowering of the processing temperature and the consequent prolongation of the waving process. Ultimately, the quality of the wave rests on the subjective judgment of the salon operator, and more often than not because of the subjective judgment the permanent waves are either underprocessed or overprocessed.

The time-temperature parameters of the reducing step depend upon the porosity of the hair, prior treatment to which it has been subjected, and the composition of the reducing agent. To eliminate the problems stemming from the subjective element, there have been developed reducing compositions and process controllers in which the time and temperature for carrying out the reducing step are predetermined for specified types of hair and particular reducing compositions. The salon operator using a time-temperature regulator can set it for the specified times and temperatures.

Since the temperature and time parameters have to be carefully regulated it is necessary to have a temperature sensing device in contact with the hair, which is extremely sensitive to changes in temperature. The commercially available sensors were found unsuitable for various reasons.

It is, accordingly, an object of the present invention to provide a temperature sensing device which will react substantially instantly to changes in temperature within very close limits.

It is another object of the present invention to provide a temperature sensing device which can be placed in intimate contact with the hair of the curl whose temperature is being measured.

It is a further object of the present invention to provide a temperature sensing device which is readily placeable and easily attachable to the hair curl.

It is still another object of the present invention to provide a temperature sensing device which can be placed in a fixed position in respect to the curl and scalp, from head to head.

It is still a further object of the present invention to provide a temperature sensing device which will withstand the corrosive action of the reducing composition.

It is still another object of the present invention to provide a temperature sensing device which can be readily cleansed by immersion in detergent solutions.

Other features and advantages of the present invention will appear from the specification and claims when considered in connection with the accompanying drawings in which:

FIG. 3 is a perspective view of the sensor assembly.

FIG. 4 is longitudinal cross-sectional view taken along the line 4—4 of FIG. 3.

FIG. 5 is a view showing the sensor assembly being inserted into the rod which has been placed on the scalp.

FIG. 6 is a view showing the fully assembled system in place on the scalp.

Figure 1:
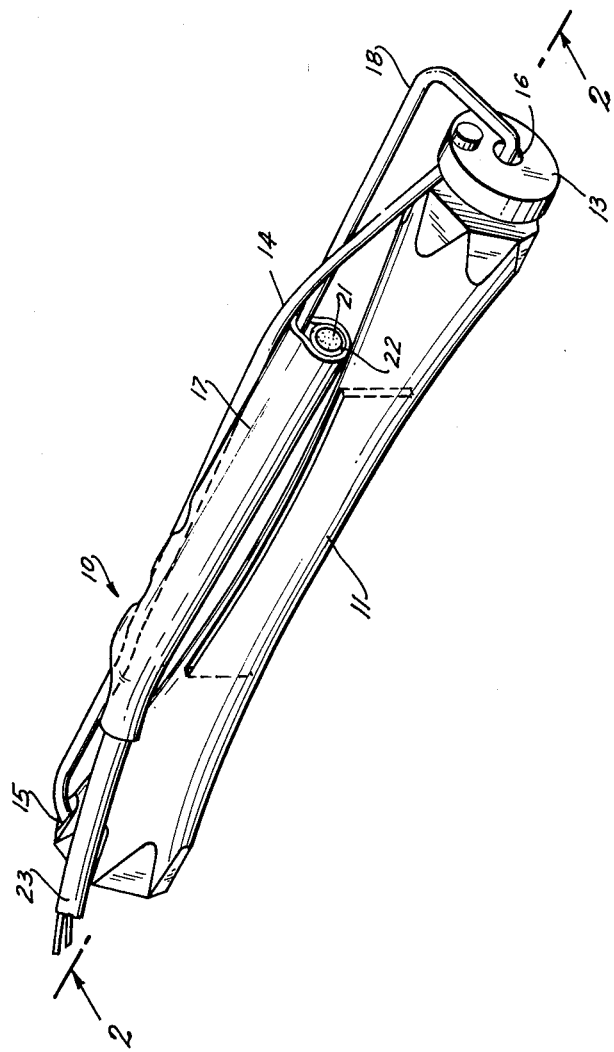
FIG. 1 is a perspective view of the temperature sensing device of the present invention.
Figure 2:
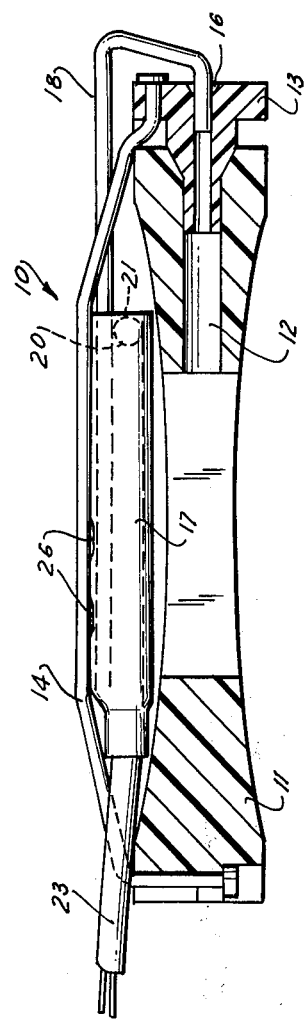
FIG. 2 is a longitudinal cross-section view taken along the line 2—2 of FIG. 1.

Referring to the drawings, a temperature sensing device constituting one embodiment of the present invention generally designated 10, includes a plastic rod 11 of the type conventionally used in permanent waving. The rod has an opening 12 at one end in which a plug 13 is inserted. To the plug 13 is attached an elastic 14, such as a rubber band, which elastic is secured to the opposite end 15 of the rod. An opening 16 bored in the plug is adapted to receive and hold in place the sensor assembly, generally designated 17 by means of a hook 18 constructed of stainless steel or other suitable material. The hook is secured to the sensor assembly under a sleeve 19 which is composed of an irradiated polyolefin such as irradiated polyvinyl chloride or other suitable plastic material. The sleeve provides a series of notches 26 which serve to maintain the position of the hook. The sensor assembly is comprised of a temperature measuring or temperature sensitive device 20 such as a thermocouple or thermistor. In practice we have found that because of its greater sensitivity a thermistor is preferable to a thermocouple. A preferred thermistor is a semi-conductor with a negative temperature coefficient of resistance, composed of a sintered mixture of oxides of manganese, nickel, chromium, cobalt, copper and iron. Such thermistor is obtainable from Fenwal Electronics division of the Walter Kidde Co. The thermistor is encapsulated as at 201 in a film composed of a material of high thermal conductivity and low water absorption such as, for example, an epoxy resin. Any commercially available epoxy resin is suitable. In the region of the thermistor's closest proximity to the hair at 21, the film has a preferable thickness of from about 0.010 to 0.015 inches (about 0.25 — 0.38mm). In other regions the encapsulated thermistor is enclosed in a sheath 22 composed of polypropylene or other suitable material such as high density polyethelene, nylon or teflon. A cable 23 extends from the sensing element to a time-temperature regulator so that the heating is automatically stopped when the thermistor measures the set temperature, and automatically resumed when the temperature falls below the set temperature.

In using the thermoregulating device of the present invention, strands of hair 24 are wrapped around the curling rod and the rod is rolled or drawn up snugly against the scalp 25, preferably at the top thereof, and retained in that position by pulling the elastic over the hair wrap and locking it into place by inserting the plug into the end of the rod. The hook which has been designed to cooperate with the opening in the plug is inserted under the elastic and pushed into the opening. The sensor assembly is then aligned to fit snugly against the hair. If desired, two or more such sensors may be used and placed on different parts of the scalp.

Using the device of the present invention in conjunction with a time-temperature regulator it is possible to control the temperature of the hair to ± 1° C. Greater sensitivity is possible with this sensor, but with the heating units presently available such greater sensitivity is not needed or desirable.

The sensor assembly has been kept in contact with the commonly used reducing lotions without showing any signs of decomposition of the protective sheath, sleeve or hook. The entire assembly can be readily cleansed by immersing in an aqueous solution of a soap or other suitable detergent.

We claim:

1. A temperature sensor adapted for use with a curling rod, comprising a temperature measuring element encapsulated in a material having high thermal conductivity, a portion of said encapsulated temperature measuring element being in direct contact with the hair, said element being joined to a cable connected to a time - temperature control device, the encapsulated unit and cable being covered by a sheath of plastic material, a hook secured to said sheath by means of a sleeve covering the portion of the hook in contact with the sheath.

2. A temperature sensor according to claim 1 wherein the encapsulating material is in the form of a film.

3. A temperature sensor according to claim 1 wherein the material having high thermal conductivity is an epoxy resin.

4. A temperature sensor according to claim 1 wherein the temperature measuring element is a thermistor.

5. A temperature sensor according to claim 4 wherein the film at the region of the thermistor in closest proximity to the hair has a thickness from about 0.01 to 0.015 inch.

6. A temperature sensor according to claim 1 wherein the sheath is composed of polypropylene.

7. A temperature sensor according to claim 6 wherein the sleeve is composed of an irradiated polyolefin.

8. A temperature sensor according to claim 7 wherein the irradiated polyolefin is irradiated polyvinyl chloride.

9. A temperature sensing device for use on the scalp comprising a rod around which strands of hair may be wound, an opening at one end of said rod adapted to receive a plug, an elastic band attached to said plug and to the opposite end of said rod, a hole in said plug adapted to receive one end of a hook, and the temperature sensor of claim 1, the sensor being secured to said rod by the free end of the hook being held in the hole of the plug and the temperature measuring element being held in contact with the strands of hair by being held against the hair by the elastic band.

* * * * *